United States Patent
Hagen et al.

(10) Patent No.: US 7,205,749 B2
(45) Date of Patent: Apr. 17, 2007

(54) POWER LINE COMMUNICATION USING POWER FACTOR CORRECTION CIRCUITS

(75) Inventors: Mark David Hagen, Rochester, MN (US); Robert E. Jansen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 94 days.

(21) Appl. No.: 11/069,032

(22) Filed: Feb. 28, 2005

(65) Prior Publication Data

US 2006/0192537 A1    Aug. 31, 2006

(51) Int. Cl.
*G05F 1/00* (2006.01)
*H02M 5/45* (2006.01)

(52) U.S. Cl. .................. 323/222; 323/207; 363/37; 363/89

(58) Field of Classification Search ............... 323/222, 323/282, 207, 283, 84, 89, 34, 37
See application file for complete search history.

(56) References Cited

U.S. PATENT DOCUMENTS 5,568,041 A * 10/1996 Hesterman ................. 323/207
6,222,746 B1 * 4/2001 Kim ............................ 363/89

* cited by examiner

*Primary Examiner*—Bao Q. Vu
(74) *Attorney, Agent, or Firm*—W. James Brady, III; Frederick J. Telecky, Jr.

(57) ABSTRACT

A PFC circuit modulating a power line using pulse width modulation (PWM) to drive a power MOSFET and series inductor across the power line. Since many modern electronic systems include a power factor correction circuit (PFC) that already includes a series inductor and power MOSFET, a PLC is incorporated into a controller to inject a PLC transmit signal into a control loop for the PFC circuit. This can be done using either an analog PFC controller, such as the UCC28517, the UCC2819A, or a digital PFC controller such as based on a TMS320C24xx DSP.

8 Claims, 5 Drawing Sheets

POWER LINE COMMUNICATION USING POWER FACTOR CORRECTION CIRCUITS

FIELD OF THE INVENTION

The present invention is generally related to power line communication (PLC), and more particularly to electronic systems having power factor correction (PFC).

BACKGROUND OF THE INVENTION

For power line communication (PLC) signals to pass through a conventional distribution transformer they need to be below about 3 kHz. By using the frequency band between 1 kHz and 3 kHz a communication channel can be established for which the range of the PLC signal is not limited by the distribution transformers. However, compared to PLC systems using higher frequencies (such as 132 kHz), the components needed to capacitively couple or transformer couple the PLC signal to the power line become prohibitively large.

Many modern electronic systems incorporate a power factor correction (PFC) circuit as part of the function of the power supply circuits. The PFC circuit's job is to generate the bulk voltage for rest of the system, and to shape the current waveform so that it tracks the incoming line voltage. By forcing the current to match the input voltage sine wave, the load the system presents to the line will look resistive and the power factor will be near 1.0. the power factor correction circuit conventionally does this by applying PWM control to a power MOSFET that is in series with an inductor across the line. A simplified schematic of one such approach is shown at 10 in FIG. 1.

SUMMARY OF THE INVENTION

The present invention achieves technical advantages as a PFC circuit modulating a power line using pulse width modulation (PWM) to drive a power MOSFET and series inductor across the power line. Since many modern electronic systems include a power factor correction circuit (PFC) that already includes a series inductor and power MOSFET, a PLC is incorporated into a controller to inject a PLC transmit signal into a control loop for the PFC circuit. This can be done using either an analog PFC controller, such as the UCC28517, the UCC2819A, or a digital PFC controller such as based on a TMS320C24xx DSP.

DETAILED DESCRIPTION OF THE PREFERRED EMBODIMENT

Figure 1:
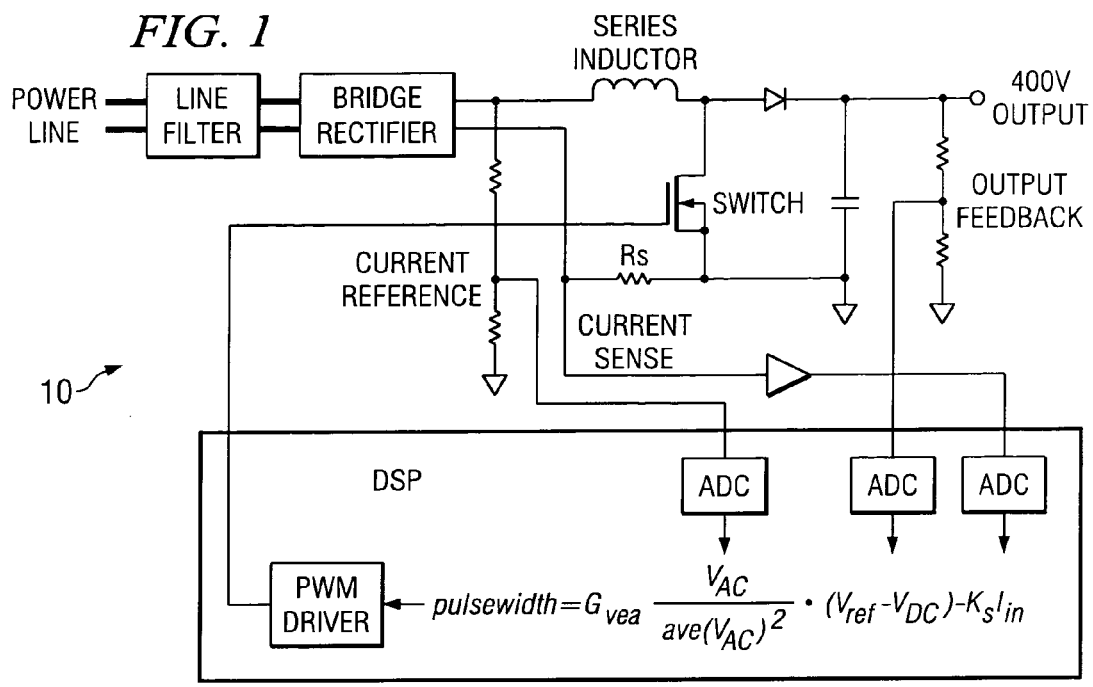
FIG. 1 is an electrical schematic of a conventional low-frequency PLC circuit.
Figure 2:
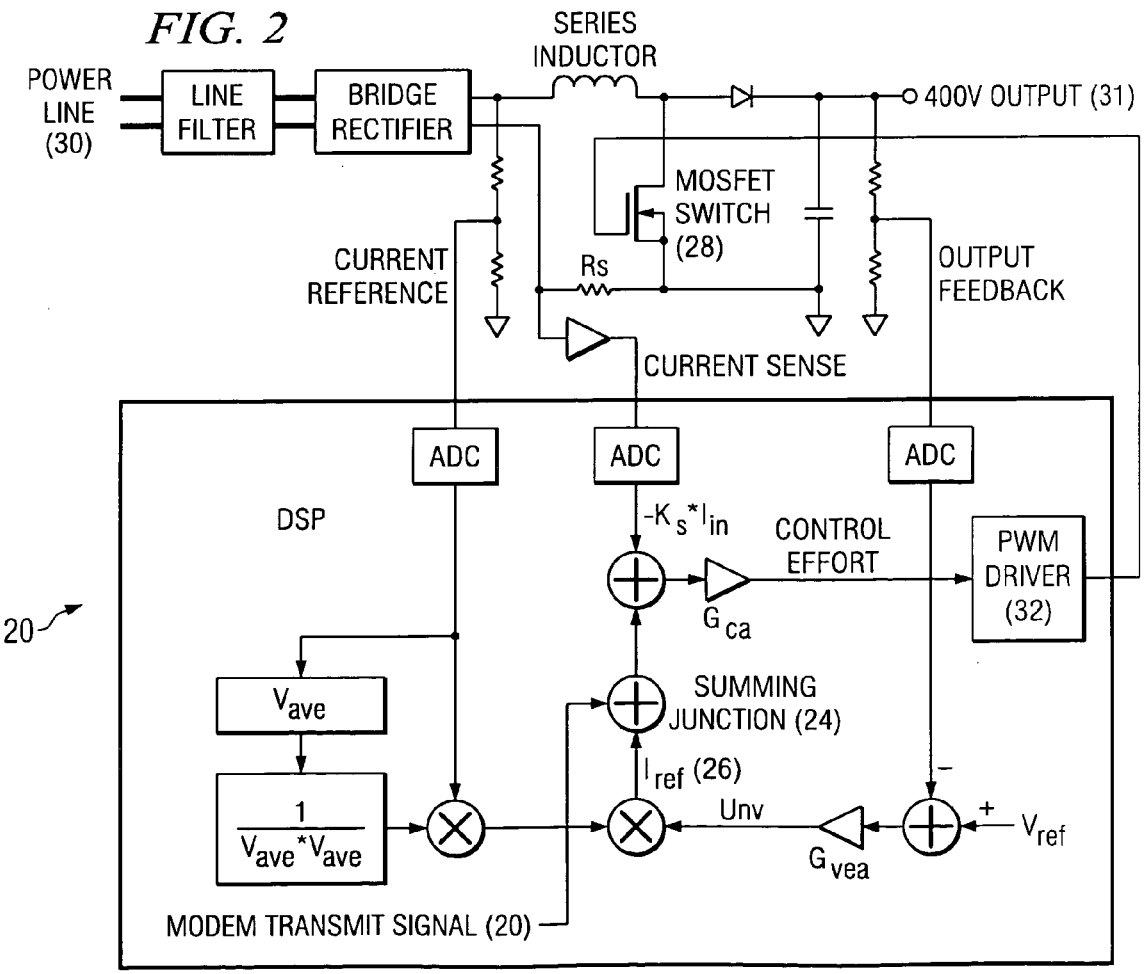
FIG. 2 is an electrical schematic of one embodiment of a PFC circuit according to the present invention.

Referring now to FIG. 2 there is shown a first preferred embodiment of the invention seen to comprise a PFC controller at 20. The PFC circuit 20 controls the current drawn from the power line so that the current follows a sine wave that is in phase with the 60 Hz line voltage. In this way a power factor value near 1.0 can be achieved. To calculate the control effort, the input power line voltage is measured and normalized by dividing by the average input voltage. This forms a reference for the controlled line current. The reference signal is further modified by adjusting it's amplitude based on the measured output voltage 31. The current is made to follow this reference voltage by comparing the measured current with the reference and using the resulting error to define the pulse width modulator (PWM) 32 duty cycle that drives the power MOSFET 28. By modifying this control effort a PLC transmit waveform, constructed in a microprocessor or DSP, can be added at 24 to the current reference signal such that the MOSFET modulates the power line 30 with the transmit signal in addition to controlling the power factor.

The present invention achieves technical advantages as a spread spectrum transmit and receive PLC system that utilizes the redundant transmission of data over multiple carriers to overcome the severe interference that can be present on a power line, although, it should be understood that a narrow band, single frequency modulation technique could be used as well. The spread spectrum technique uses orthogonal frequency division multiplexing (OFDM) to define a transmit waveform that consists of multiple orthogonal subcarrier frequencies. To construct the transmit waveform, message data is used to define a complex modulation symbol for each subcarrier. These symbols are then assigned to the input bins of an inverse fast Fourier transform (IFFT) algorithm which generates the time domain transmit waveform as it's output.

By injecting the PCL transmit signal 22 into the control loop of the PFC circuit 20 at the MOSFET 28, the PLC transmit signal 22 is modulated by the line voltage on power line 30. That is, when the line voltage goes to zero, so will the PLC transmit signal 22. Therefore, the actual frequency content will consist of the original carrier signal +/−60 Hz. To account for this fact the sample rate of the MOSFET 28 by a PWM driver 32 and carrier-to-carrier spacing is precisely defined.

Figure 3:
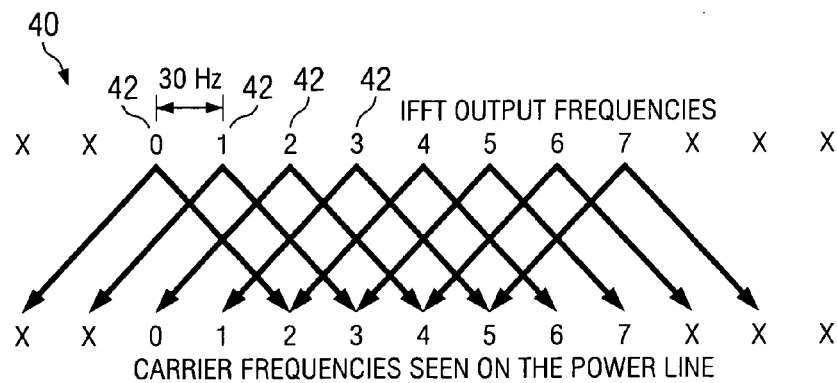
FIG. 3 depicts an IFFT/1FT algorithm according to one embodiment of the present invention.
Figure 4:
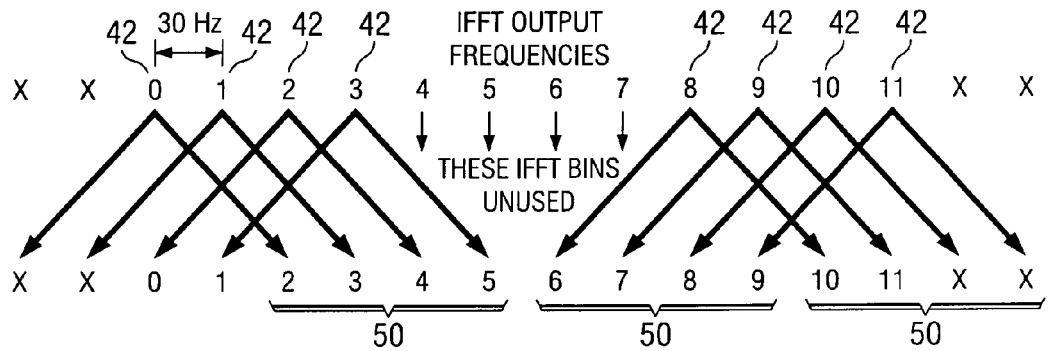
FIG. 4 shows IFFT/1FT subcarrier grouping.

FIG. 3 depicts an IFFT algorithm at 40 which shows this effect where carrier frequency #2 and above will contain information from two output bins 42 of the IFFT algorithm. In this embodiment, the carrier frequency range is from 800 Hz to 2880 Hz and the carrier spacing is 30 Hz. To resolve this ambiguity, the carrier frequencies of output bins 42 are grouped in blocks of 4, as shown at 50 in FIG. 4, so that each data symbol of the PLC transmit signal is used to modulate two carrier frequencies on the power line.

Table I below depicts the key parameters of one embodiment of a low frequency spread-spectrum PLC system.

TABLE I

| Low Frequency Spread-Spectrum packet Description | | |
| --- | --- | --- |
| Parameter | 60 Hz system | 50 Hz system |
| Fs (DSP sample rate) | 7,680 Hz | 6,400 Hz |
| Frame length | 256 samples | 356 Samples |

TABLE I-continued

Low Frequency Spread-Spectrum packet Description

| Parameter | 60 Hz system | 50 Hz system |
|---|---|---|
| FFT resolution | 30 Hz | 25 Hz |
| Minimum carrier frequency | 840 Hz | 875 Hz |
| Maximum carrier frequency | 2700 Hz | 2250 Hz |
| Num of carriers | 63 | 56 |
| Modulation method | BPSK | BPSK |
| Redundancy code rate | 1/7 msg bit/coded bit | 1/7 msg bit/coded bit |
| Message length | 32 bits | |
| Num of message bits/frame | 9 bits | 8 bits |
| Message data rate | 270 b/s | 200 b/s |

Figure 5:
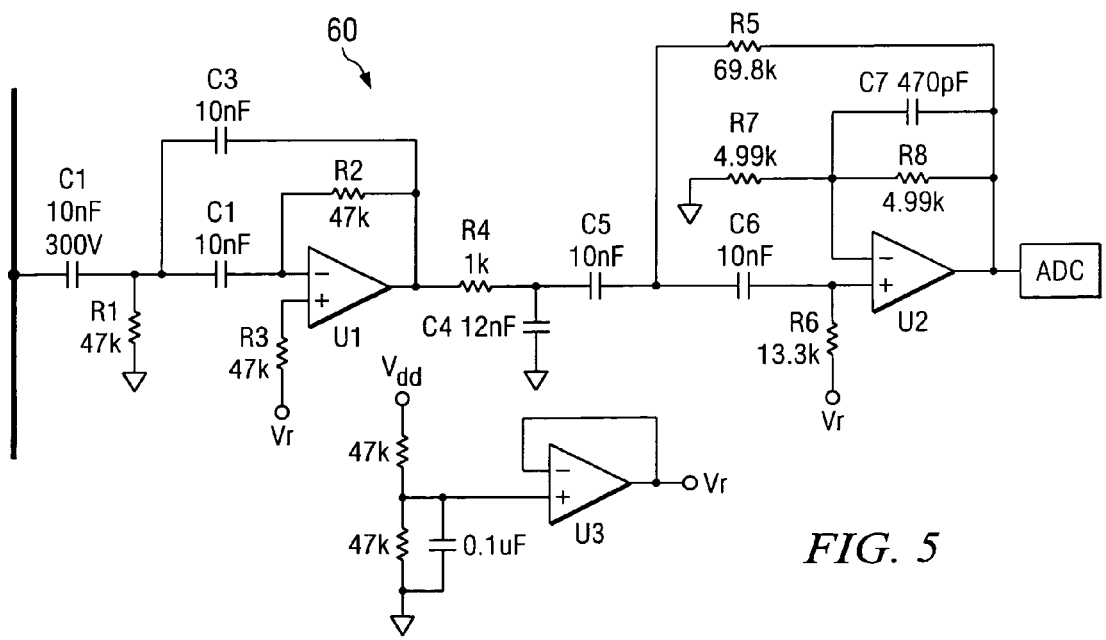
FIG. 5 shows an electrical schematic of a receive filter/amplifier.
Figure 6:
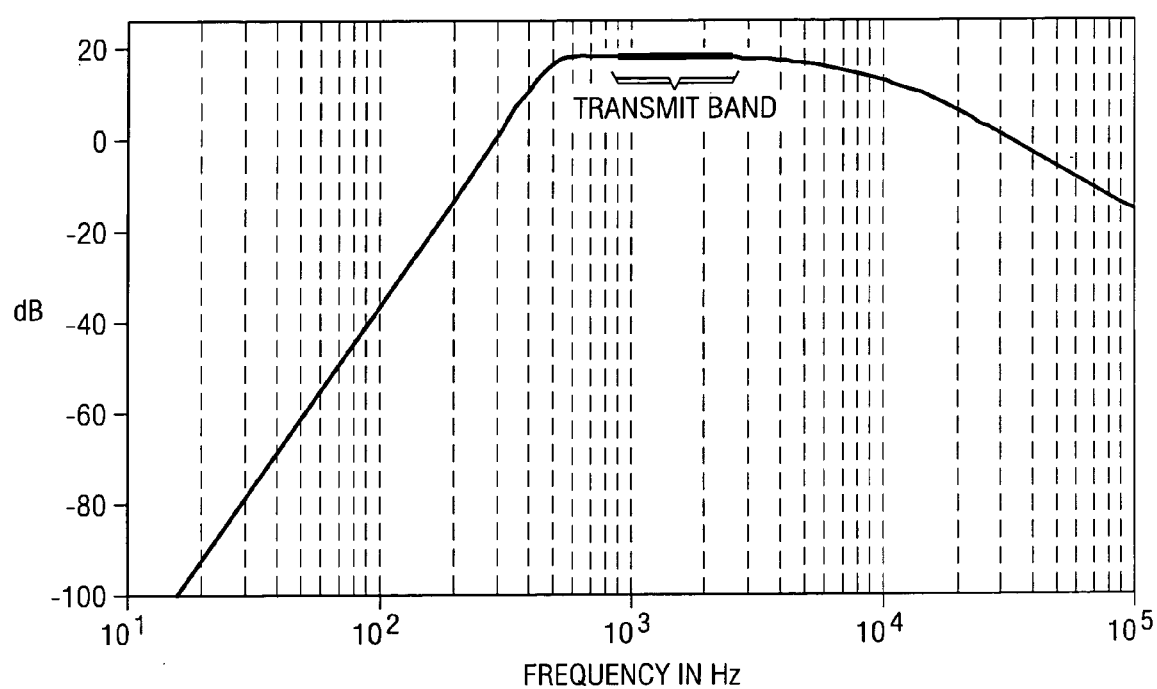
FIG. 6 shows a graph of the bandpass amplifier response.

To receive the signal transmitted on the power line, a bandpass amplifier/filter circuit is used to extract the signal from the power line. The output of this amplifier is sampled by an analog to digital converter (ADC) at the same sample rate as is used by the transmit method. FIG. 5 depicts at 60 one such receive filter/amplifier circuit, having a bandpass frequency response shown at 62 in FIG. 6. In this circuit 60, circuit U1 forms a second order high pass filter with a cutoff frequency set to 790 Hz. Note that most of the 115VAC voltage is dropped across capacitor C1 so this component needs to be a high voltage part, however, the remainder of the circuit 60 uses inexpensive low voltage (16V) components. The first filter stage is coupled to the second filter stage through a RC lowpass network which limits the system bandwidth to 15 kHz. Circuit U2 forms a second, second order high pass filter which is in series with the first filter. This second filter uses a modified Sallen-Key topology. Resistors R7 and R8 set the gain of this stage giving a total system gain of 19 dB in the passband The output of the bandpass amplifier 60 is sampled by an ADC and grouped into FFT frames of 256 samples. Each FFT frame is applied to the fast Fourier transform (FFT) and the resulting complex output values associated with the transmitted subcarriers are defined as the received symbols. A phase distance metric is calculated for each subcarrier and summed over each symbol associated with a redundantly transmitted subcarrier.

$$symbol_n = cr_n + j \cdot ci_n$$

$$distance = cr_n \cdot cr_{n-1} + ci_n \cdot ci_{n-1} \quad \text{Equation 1}$$

Where $symbol_n$ is the nth subcarrier symbol from the FFT output. Since each transmitted message bit is repeated 7 times, the metric distance is summed for each received symbol associated with the transmitted message bit. If the metric is positive a zero is detected, if the metric is negative, a one is detected.

Figure 7A:
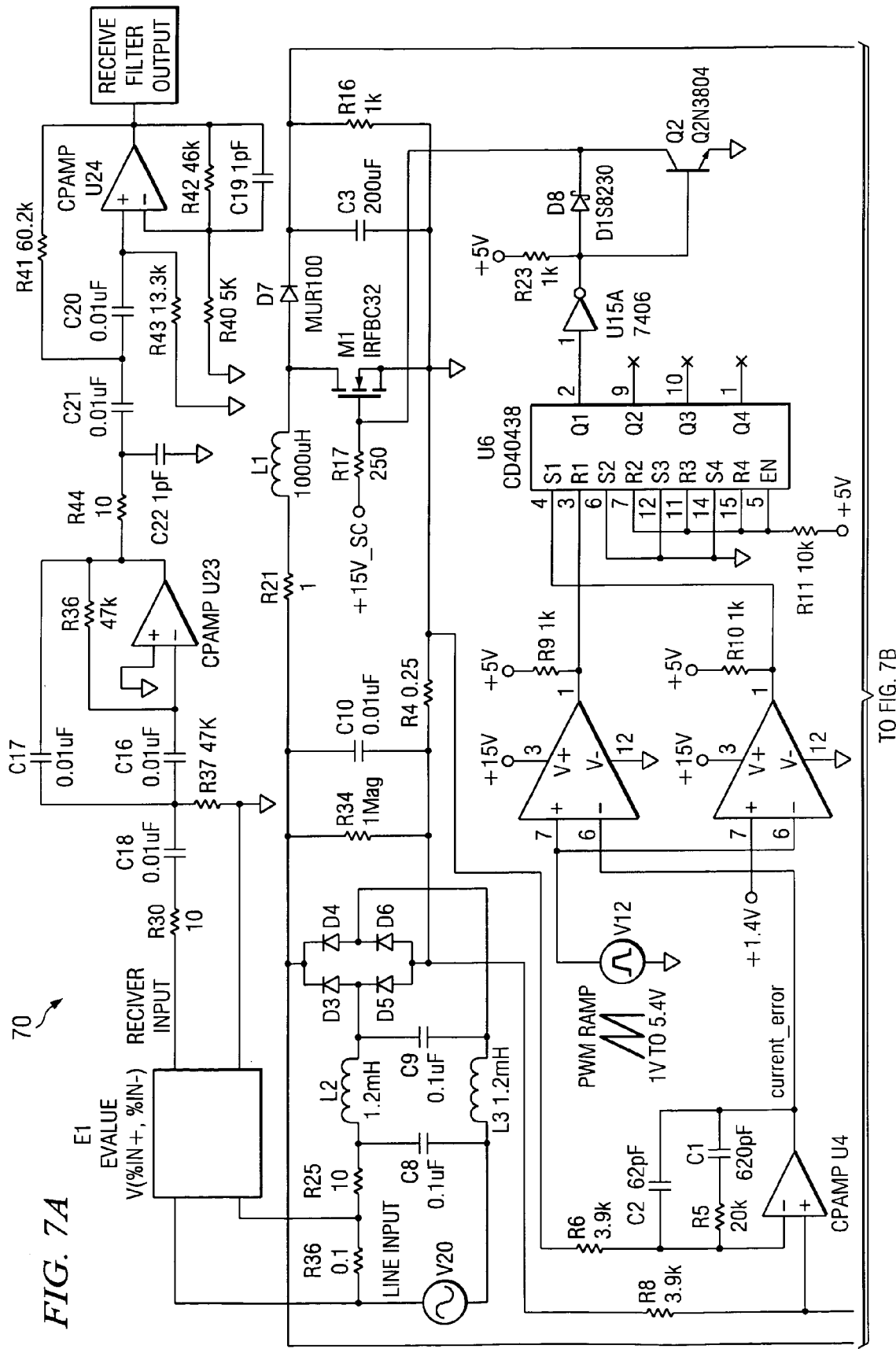
FIG. 7 shows an electrical schematic of an analog controller Spice.
Figure 7B:
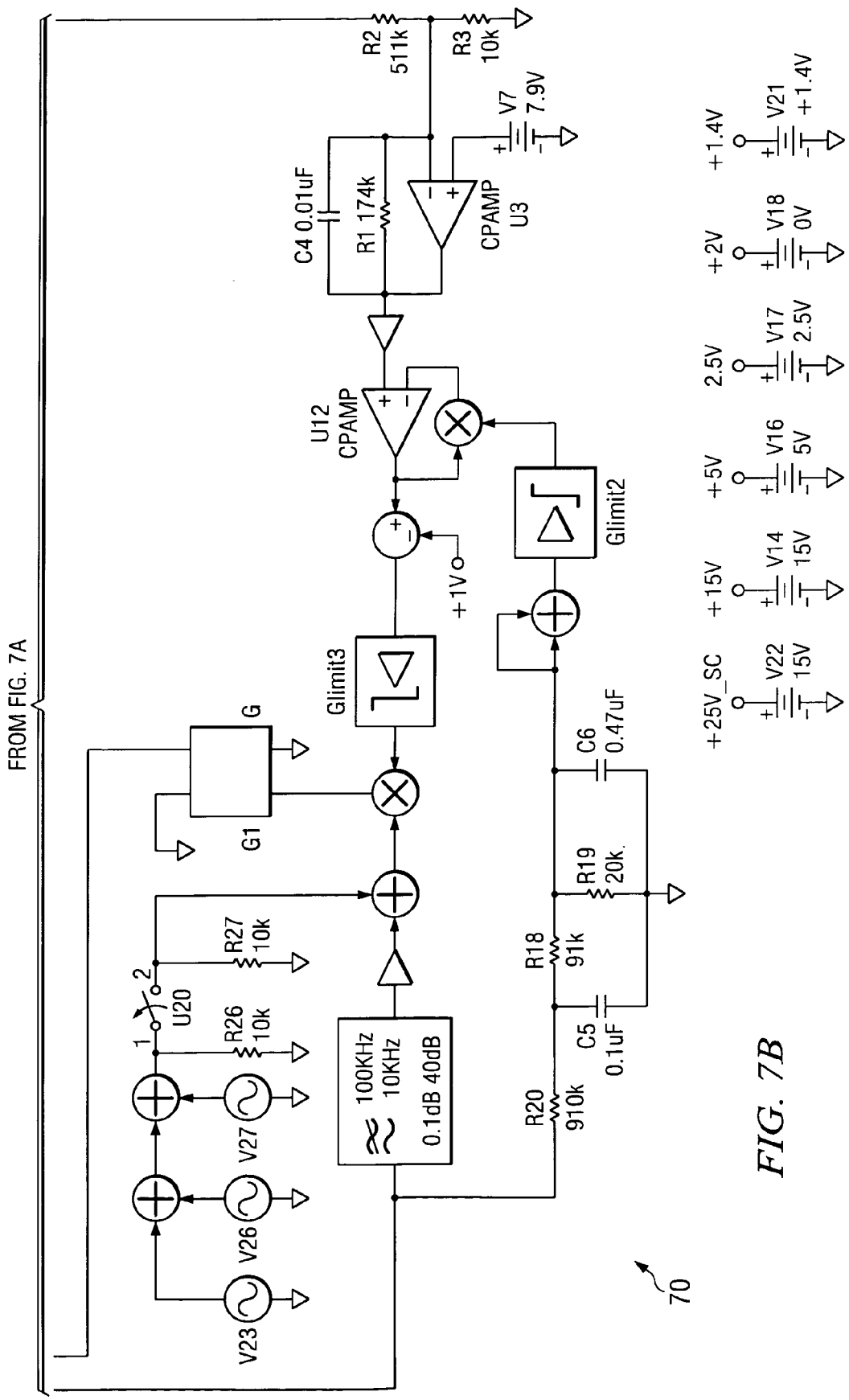

FIG. 7 depicts at 70 an analog controller spice model schematic of one embodiment of the present invention.

It should also be apparent that the subcarrier frequencies and sampling rate can be adjusted so that the same arrangement of non-overlapping subcarrier frequencies can be obtained for a 50 Hz power line or a power line of arbitrary mains frequency.

Additionally, it should be apparent that defining the sample rate and length of the IFFT frame so that the subcarrier spacing is 60 Hz instead of 30 Hz would produce a PLC system where the received subcarriers do not overlap when the transmit subcarriers are arranged in groups of 2. That is, output from the IFFT routine, via the DAC, two subcarriers, then skip two subcarriers, then output the next two subcarriers, etc.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A power factor correction (PFC) circuit, comprising:
a pulse width modulator (PWM) providing a PWM control signal;
a power MOSFET adapted to control a line current drawn from a power line based on the PWM control signal; and
wherein the PWM control signal is constructed so that both a 50 Hz and 60 Hz said line current is controlled to maintain a desired power factor and a higher frequency current is applied to the power line to implement the transmission of a Power Line Communications (PLC) waveform.

2. The power factor correction circuit as specified in claim 1 wherein the PLC waveform has a plurality of subcarriers having subcarrier frequencies, and the subcarrier frequencies are defined so that there is no overlapping of frequency content due to the modulation of the PLC waveform with the 50 Hz and 60 Hz line voltage.

3. The power factor correction circuit as specified in claim 2 wherein the PLC carrier frequency contains information from multiple output bins of a IFFT/FFT algorithm each having a different subcarrier frequency.

4. The power factor correction circuit as specified in claim 3 wherein the subcarrier frequencies are modulated using binary phase shift keying (BPSK).

5. The power factor correction circuit as specified in claim 3 wherein the subcarrier frequencies are spaced 30 Hz apart for the 60 Hz line current, and 25 Hz apart for the 50 Hz line current, and the subcarriers are grouped into blocks of 4 so that each received subcarrier contains information from only one message bit.

6. The power factor correction circuit as specified in claim 3 wherein the subcarrier frequencies are spaced 60 Hz apart for the 60 Hz line current, and 50 Hz apart for the 50 Hz line current and the subcarriers are grouped into blocks of 2 so that each received subcarrier contains information from only one message bit.

7. The power factor correction circuit as specified in claim 3 wherein the PWM has a signal processing sample rate of 7680 Hz for the 60 Hz line current, and 6400 Hz for the 50 Hz line current, and the IFFT/FFT algorithm has a frame length of 256 samples and the subcarrier frequency spacing is 30 Hz for the 60 Hz line current and 25 Hz for the 50 Hz line current.

8. The power factor correction circuit as specified in claim 3 wherein the PWM has a signal processing sample rate of 7680 Hz for a 60 Hz line current, and 6400 Hz for the 50 Hz line current and the IFFT/FFT algorithm has a frame length of 128 samples and the subcarrier frequency spacing is 60 Hz for the 60 Hz line current and 25 Hz for the 50 Hz line current.

* * * * *